Inventors
JOSEPH F. ESTES
HELMUT BRUCHMANN
By Prangley, Baird, Clayton, Miller & Vogel
Attys.

Inventors
JOSEPH F. ESTES
HELMUT BRUCHMANN

United States Patent Office 3,288,615
Patented Nov. 29, 1966

3,288,615
POROUS CERAMIC BODIES AND COMPOSITE MEMBERS AND METHODS OF MAKING THE SAME
Joseph F. Estes, Dundee, and Helmut Bruchmann, Woodstock, Ill., assignors to The Haeger Potteries, Inc., Dundee, Ill., a corporation of Illinois
Filed Sept. 17, 1964, Ser. No. 397,265
5 Claims. (Cl. 106—40)

This application is a continuation-in-part of the copending application for United States Letters Patent Serial No. 117,679 filed June 16, 1961, for Ceramic Materials and Methods of Making the Same, now abandoned.

This invention relates to porous ceramic bodies and to composite members made therefrom, and to methods of making such porous ceramic bodies.

It is an important object of the present invention to provide an improved cellular and porous ceramic body having a substantial and uniform capillary porosity.

In connection with the foregoing object, it is another object of the invention to provide an improved porous ceramic body which has therein open cells interconnected in such a manner as to provide a single unitary passage extending from each area in the ceramic body to any other area therein and to and terminating at the surface thereof, the cells being capillary in size and providing true capillary porosity throughout the porous ceramic body.

Yet another object of the invention is to provide an improved porous ceramic body of the type set forth which is hard and which has improved structural strength including improved flexural strength and improved impact resistance and an improved modulus of elasticity.

Still another object of the invention is to provide an improved porous ceramic body that has a hardness such that it may be readily worked and shaped by means of ordinary tools and can thereafter be further fired substantially to increase the hardness and the strength thereof while maintaining the major portion of the porosity thereof.

Another object of the invention is to provide an improved porous ceramic body which has a high resistance to thermal shock and which is highly inert chemically to substantially all reagents including concentrated acids and concentrated bases.

Still another object of the invention is to provide a composite member which includes a porous ceramic body comprising a first continuous phase throughout the composite member, and a filler body disposed in and substantially completely filling the passages throughout the porous ceramic body and providing a second continuous phase throughout the composite member intimately intertwined and interlocked with the first continuous phase.

A further object of the invention is to provide improved methods of making porous ceramic bodies of the type set forth.

Further features of the invention pertain to the particular construction and composition of the porous ceramic bodies and the composite members of the present invention and of the steps of the methods of making such porous ceramic bodies and composite members, whereby the above-outlined and additional operating features are attained.

The invention, both as to its organization and method of operation, together with further objects and advantages thereof will best be understood by reference to the following specification taken with the accompanying drawings, in which.

Figure 1:
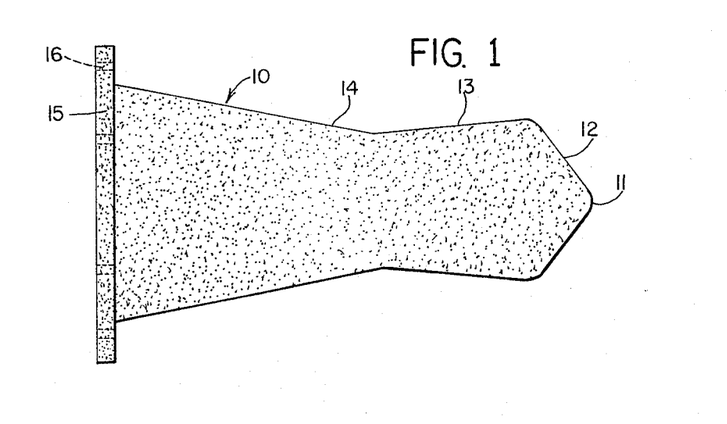
FIGURE 1 is a side elevational view of a filter cone made in accordance with and embodying therein the principles of the present invention.

There is a substantial demand today in the art for articles made of cellular and porous ceramic materials which have substantial thermal shock resistance and substantial resistance to chemical reagents. In certain applications, the article must have a relatively complicated shape and must have relatively close dimensional tolerances when fully fabricated. An example of such an article is illustrated in FIG. 1 of the drawings wherein there is shown a filter cone 10 for use in the filtering of acidic or basic solutions which may be either hot or cold. The filter cone 10 includes a rounded blunt point 11 disposed to the right in FIG. 1 from which extends rearwardly a conical outwardly flaring section 12 which joins a rearwardly converging conical section 13 which in turn joins a rearwardly diverging conical section 14 terminating in an attachment flange 15, the flange 15 being directed outwardly and provided with a plurality of apertures 16 therethrough for the purpose of mounting the filter cone 10 upon the associated filter machinery. In use, the filter cone 10 may be subjected to rapid changes in temperature and must therefore be highly resistant to thermal shock. In order to fit the associated filter machinery, the shape of the filter cone 10 must conform well to a predetermined design and have relatively close dimensional tolerances. In accordance with the present invention, the filter cone 10 is formed of porous ceramic and may have a porosity equal to as high as 60° by volume, thereof, whereby readily pass fluids therethrough.

It has now been found in accordance with the present invention that the filter cone 10 may advantageously be formed as a porous ceramic body comprising mineral species consisting essentially of the equivalent oxides, the mineral species containing the equivalent of an alkaline metal oxide of a metal selected from the group consisting of lithium and sodium and potassium and beryllium and magnesium and calcium and strontium and barium, silicon oxide, and aluminum oxide; at least one of the mineral species being a tectosilicate containing at least one of the alkaline metal oxides of a metal selected from the group consisting of lithium and sodium and calcium and strontium and barium; all of the silicon oxide being present in a tectosilicate. In the porous ceramic body, it further is preferred that substantially all of the alkaline metal oxides and all of the aluminum oxide in excess of that required in the tectosilicates be present in the ceramic body and distributed therethrough and as mineral species selected from the group consisting of corundum and periclase and alkaline metal aluminates.

More particularly, the porous ceramic body of the present invention comprises a framework of one or more tectosilicates which provide a physically porous three-dimensional network, the framework sometimes further incorporating therein mineral species other than tectosilicates, the other mineral species being physically included within the three-dimensional network of the tectosilicates. The tectosilicates that are useful in the present invention include the feldspars, the feldspathoids and quartz; the feldspars that are found to be most useful are the lithium feldspar having the formula $Li_2O.Al_2O_3.6SiO_2$, the potassium feldspar having the formula $K_2O.Al_2O_3.6SiO_2$ (orthoclase), sodium feldspar having the formula $$Na_2O.Al_2O_3.6SiO_2$$

(albite), calcium feldspar having the formula $$CaO.Al_2O_3.2SiO_2$$

(anorthite), strontium feldspar having the formula $$SrO.Al_2O_3.2SiO_2$$

and barium feldspar having the formula $$BaO.Al_2O_3.2SiO_2$$

(celsian); the feldspathoids which have been found to be most useful are carnegieite having the formula
$Na_2O.Al_2O_3.2SiO_2$
kaliophyllite having the formula $K_2O.Al_2O_3.2SiO_2$, leucite having the formula $K_2O.Al_2O_3.4SiO_2$, calcium gehlenite having the formula $2CaO.Al_2O_3.SiO_2$ and strontium gehlenite having the formula $2SrO.Al_2O_3.SiO_2$. The other mineral species which may be distributed physically throughout the tectosilicate framework are aluminates and oxides; the aluminates which are useful are lithium aluminate having the formula $Li_2O.5Al_2O_3$, beryllium aluminate having the formula $BeO.Al_2O_3$ (chrysoberyl), magnesium aluminate having the formula $MgO.Al_2O_3$ (spinel), calcium aluminate having the formula $CaO.Al_2O_3$ and barium aluminate having the formula $BaO.Al_2O_3$; and the oxides which are useful in the present invention are periclase having the formula $MgO$ and corundum having the formula $Al_2O_3$.

In order further to illustrate the present invention, the following specific examples are given, but it is to be understood that these examples are not intended and are not to be construed as a limitation of the invention but only as illustrations thereof.

EXAMPLE 1

The following proportions by weight of the ingredients indicated were mixed:

Table I

| Ingredient: | Percent by weight |
|---|---|
| #27 Kaolin | 12.0 |
| Ball clay, Tennessee #1 | 18.0 |
| Talc #2778 | 3.0 |
| Feldspar F-4 | 5.0 |
| Dolomite "A—A" | 18.0 |
| Tabular alumina #61 | 44.0 |
| | 100.0 |

The #27 kaolin was used as received, this kaolin having the gross composition indicated in the column to the left and after firing to remove the organic material and the combined water having the composition shown in the column to the right:

Table II

| #27 Kaolin | Percent by Weight | |
|---|---|---|
| | Before Ignition | After Ignition |
| $K_2O$ and $Na_2O$ | 0.42 | 0.49 |
| $TiO_2$ | 1.27 | 1.47 |
| $Fe_2O_3$ | 0.29 | 0.34 |
| $Al_2O_3$ | 39.30 | 45.63 |
| $SiO_2$ | 44.86 | 52.07 |
| Loss on Ignition | 86.14 | 100.00 |
| | 13.86 | |
| | 100.00 | |

The Tennessee #1 ball clay was used as received and had the gross composition indicated in the column to the left and after firing to remove the organic material and the combined water having the composition shown in the column to the right:

Table III

| Ball Clay, Tennessee #1 | Percent by Weight | |
|---|---|---|
| | Before Ignition | After Ignition |
| $Na_2O$ | 0.73 | 0.83 |
| $K_2O$ | 0.77 | 0.87 |
| $MgO$ | 0.18 | 0.20 |
| $CaO$ | 0.15 | 0.17 |
| $Al_2O_3$ | 34.00 | 38.61 |
| $Fe_2O_3$ | 0.80 | 0.91 |
| $SiO_2$ | 49.90 | 56.62 |
| $TiO_2$ | 1.58 | 1.79 |
| Loss on Ignition | 88.11 | 100.00 |
| | 11.89 | |
| | 100.00 | |

The #2778 talc was used as received, this talc having the gross composition indicated in the column to the left and after firing to remove the organic material and the combined water having the composition shown in the column to the right:

Table IV

| #2778 Talc | Percent by Weight | |
|---|---|---|
| | Before Ignition | After Ignition |
| $K_2O$ | 0.22 | 0.25 |
| $Na_2O$ | 0.98 | 1.11 |
| $Fe_2O_3$ | 0.27 | 0.31 |
| $Al_2O_3$ | 1.13 | 1.28 |
| $CaO$ | 10.80 | 12.26 |
| $MgO$ | 23.77 | 26.99 |
| $SiO_2$ | 50.90 | 57.80 |
| Loss on Ignition | 88.07 | 100.00 |
| | 11.93 | |
| | 100.00 | |

The feldspar F-4 was used as received, this feldspar having the cross composition indicated in the column to the left and after firing to remove the organic material and the combined water having the composition shown in the column to the right:

Table V

| Feldspar F-4 | Percent by Weight | |
|---|---|---|
| | Before Ignition | After Ignition |
| $Na_2O$ | 2.70 | 2.71 |
| $K_2O$ | 10.60 | 10.62 |
| $CaO$ | 0.20 | 0.20 |
| $Al_2O_3$ | 17.30 | 17.34 |
| $Fe_2O_3$ | 0.07 | 0.07 |
| $SiO_2$ | 68.93 | 69.06 |
| Loss on Ignition | 99.80 | 100.00 |
| | 0.20 | |
| | 100.00 | |

The dolomite "A—A" was used as received and had the following composition:

Table VI

| Dolomite "A—A": | Percent by weight |
|---|---|
| $CaCO_3$ | 54.45 |
| $MgCO_3$ | 40.65 |
| Tremolite ($CaO.3MgO.4SiO_2$) | 4.60 |
| $Al_2O_3$ | 0.20 |
| $Fe_2O_3$ | 0.10 |
| | 100.00 |

The tabular alumina #61 contained 99.5% aluminum oxide and was used as received.

The mixture of ingredients set forth in Table I above was ground in the wet, sodium silicate being added to improve the flowability of the mixture in an amount equal to about 0.2% of the starting solids. Sufficient water was added during grinding to raise the water content of the mixture to 45% by weight, the grinding being continued until only a trace of the solids was retained on a 325 mesh screen, the material retained on the screen being discarded. The ceramic slip thus formed was then cast in a mold having the general shape of the filter cone 10 in FIG. 1, but having increased dimensions to permit and compensate for the shrinkage thereof during the prefiring and the final firing. The "green ware" or green body thus resulting was then dried to ambient conditions and was then ready for prefiring.

The green body was placed in a furnace at ambient temperature and the temperature within the furnace raised from ambient at a rate of 250° F. per hour until the final firing temperature of 1,850° F. was attained, after which the heat source for the furnace was de-energized and the furnace was allowed to cool to room temperature over a period of several hours. At this stage of manufacture, the ceramic body has had all of the water removed therefrom and the carbonates have been fully decomposed to form the corresponding oxides, the magnesium carbonate having substantially completely decomposed at a temperature of about 1,292° F. and the calcium carbonate having been substantially completely decomposed at a temperature of about 1,517° F., the magnesium carbonate decomposing into magnesium oxide and carbon dioxide gas and the calcium carbonate decomposing into calcium oxide and carbon dioxide gas. Since the individual particles of calcium carbonate and magnesium carbonate are small and are thoroughly dispersed throughout the green body, the carbon dioxide gas produced by the decomposition thereof upon heating is also thoroughly dispersed throughout the green body and forms small individual cells that are uniformly distributed and of substantially uniform size. As the carbon dioxide gas formed is further heated, it passes from cell to cell and eventually to the surface of the green body and as a result of this evolution and escape of the carbon dioxide gas uniformly throughout the body as it is fired, cells of uniform size and uniform dispersion throughout the body are also formed, the cells being open and interconnected to form essentially a single unitary passage throughout the body. Since about one-fifth of a starting materials on a dry basis are carbonates, the prefired ceramic body has a high porosity of about 60% thereof by volume.

The prefired ceramic body has a low hardness and accordingly can be readily machined using ordinary tools, and by a careful calculation, it is possible to impart dimensions to the prefired ceramic body such that the fully fired filter cone 10 will have dimensions well within manufacturing tolerances superior to those generally adhered to in the ceramics field. More specifically, a major portion of the shrinkage of the green body is removed during the prefiring thereof, since all of the water is removed and all the carbonates are decomposed during this step. Further shrinkage of the prefired ceramic body in forming the ceramic member or filter cone 10 is substantially directly proportional to the change in porosity (as will be described more fully hereinafter), this shrinkage being controllable by the choice of the temperature of the final firing and being highly predictable, whereby a careful shaping and machining of the prefired ceramic body will result in highly predictable final dimensions of the fully fired filter cone 10.

After the final machining and shaping of the prefired ceramic body, it was again placed in the furnace at ambient temperature and the temperature within the furnace raised from ambient at a rate of 250° F. per hour until the final firing temperature of 2,430° F. was attained, after which the heat source for the furnace was de-energized and the furnace was allowed to cool to room temperature over a period of several hours. The filter cone 10 has a porosity of about 50% by volume, the porosity being provided by a plurality of open cells disposed throughout the filter cone 10 and all interconnected to form a single unitary passage extending throughout the body of the filter cone 10, whereby the unitary passage extends from each area in the filter cone to any other area therein and also extends to and terminates at the surface thereof at a plurality of points. The various portions of the passage and the cells therein are relatively uniform in size and impart to the filter cone 10 true capillary porosity throughout the body thereof. The hardness of the final fired filter cone 10 is substantially greater than that of the prefired body, but is still such that further shaping thereof can be had using suitable tools if desired. The filter cone 10 is highly resistant to thermal shock and is inert to most corrosive chemicals, whereby it is admirably suited for its intended use.

The porous ceramic body made in accordance with Example 1 above has outstanding structural properties, for example, a modulus of flexural strength of 4,780 p.s.i., a modulus of elasticity of $3.56 \times 10^6$ p.s.i. and a specific gravity of about 1.45.

The porous ceramic body was examined to determine the mineral species therein utilizing a standard X-ray diffractometer examination method. The porous ceramic body was first ground to a fineness such that it passes through a 200 mesh screen. The sample so prepared was examined using a North American Philips Company, Inc. X-ray instrument operating at 35 kva., 18 ma., utilizing a copper anode and a Ka nickel filter. The resultant chart was compared with the A.S.T.M. standard cards for the various minerals to determine which mineral species were present. It was found that the porous ceramic body of Example 1 above contained the minerals anorthite, orthoclase, albite, spinel, corundum and quartz. After firing the ingredients set forth in Table I above, the resultant porous ceramic body has the following compositions expressed as the equivalent oxides therein:

*Table VII*

[Chemical composition, percent by weight]

| Oxide | Before Ignition | After Ignition | Empirical Composition |
|---|---|---|---|
| CaO | 6.07 | 6.93 | 0.464 |
| MgO | 4.49 | 5.13 | 0.476 |
| $K_2O$ | 0.51 | 0.58 | 0.023 |
| $Na_2O$ | 0.53 | 0.61 | 0.037 |
| $Al_2O_3$ | 55.29 | 63.14 | 2.310 |
| $Fe_2O_3$ | 0.24 | 0.27 | 0.0063 |
| $SiO_2$ | 20.03 | 22.87 | 1.425 |
| $TiO_2$ | 0.41 | 0.47 | 0.022 |
|  |  | 100.00 |  |

In arriving at the distribution of the various oxides among the mineral species present in the porous ceramic body of Example 1, the $Fe_2O_3$ and the $TiO_2$ are assigned to the tectosilicates as is all of the $SiO_2$. Among the feldspar mineral species, the ratio expressed in mole percent of the potassium feldspar (orthoclase) to the sodium feldspar (albite) to the calcium feldspar (anorthite) is 2.52:3.74:93.74. Of the mineral species present, the feldspars represent 49.09 mole percent, the spinel 19.99 mole percent, the corundum 27.63 mole percent and the quartz 3.29 mole percent of the porous ceramic body of Example 1.

Yet other mineral species can be generated in the porous ceramic body using different ratios of the same starting ingredients as those used in Example 1, the following is an example of such a porous ceramic body.

EXAMPLE 2

The following proportions by weight of the ingredients indicated were mixed:

*Table VIII*

| Ingredient: | Percent by weight |
|---|---|
| #27 kaolin | 16.00 |
| #600 kaolin | 16.00 |
| Tabular alumina #61 | 34.00 |
| Dolomite "A—A" | 32.50 |
| Talc #2778 | 1.50 |
|  | 100.00 |

The #600 kaolin was used as received and had the gross composition indicated in the column to the left and after firing to remove the organic material and the combined water had the composition shown in the column to the right:

*Table IX*

| #600 Kaolin | Percent by Weight | |
|---|---|---|
|  | Before Ignition | After Ignition |
| $K_2O$ and $Na_2O$ | 0.20 | 0.23 |
| CaO | 0.50 | 0.57 |
| MgO | 0.50 | 0.57 |
| $TiO_2$ | 1.23 | 1.41 |
| $Fe_2O_3$ | 0.11 | 0.13 |
| $Al_2O_3$ | 37.14 | 42.63 |
| $SiO_2$ | 47.46 | 54.46 |
|  | 87.14 | 100.00 |
| Loss on Ignition | 12.86 |  |
|  | 100.00 |  |

The ingredients of the mixture set forth in Table VIII above were ground, formed into a slip, prefired and fired in the same manner as set forth in Example 1 above, the only difference being that the final firing temperature was 2,490° F. The resultant porous ceramic body had a porosity of about 46% by volume thereof and had outstanding structural properties, for example, a tensile strength of 1,300 p.s.i., a modulus of flexural strength of 5,000 p.s.i., a modulus of elasticity of $2.18 \times 10^6$ p.s.i., an impact resistance, notched Izod, of 0.24 ft.lbs./inch, and a specific gravity of about 1.45.

Upon examining the porous ceramic body made in accordance with Example 2 above utilizing the standard X-ray diffractometer examination method described with respect to Example 1, it was found that the porous ceramic body of Example 2 contained the minerals anorthite, orthoclase, albite, spinel and calcium aluminate. After firing the ingredients set forth in Table VIII above, the resultant porous ceramic body has the following composition expressed as the equivalent oxides therein:

*Table X*

[Chemical composition, percent by weight]

| Oxide | Before Ignition | After Ignition | Empirical Composition |
|---|---|---|---|
| CaO | 10.354 | 12.812 | 0.5065 |
| MgO | 7.210 | 8.923 | 0.4890 |
| $K_2O$ | 0.053 | 0.066 | 0.0016 |
| $Na_2O$ | 0.066 | 0.082 | 0.0029 |
| $Al_2O_3$ | 46.217 | 57.168 | 1.240 |
| $Fe_2O_3$ | 0.103 | 0.127 | 0.00176 |
| $SiO_2$ | 16.427 | 20.327 | 0.751 |
| $TiO_2$ | 0.400 | 0.495 | 0.0137 |
| $CO_2$ | 14.687 |  |  |
| Loss on Ignition | 4.483 |  |  |
|  | 100.000 | 100.000 |  |

In arriving at the distribution of the various oxides among the mineral species present in the porous ceramic body of Example 2, the $Fe_2O_3$ and the $TiO_2$ are assigned to the tectosilicates. Among the feldspar mineral species, the ratio expressed in mole percent of the potassium feldspar (orthoclase) to the sodium feldspar (albite) to the calcium feldspar (anorthite) is 0.22:0.41:99.37. Of the mineral species present, the feldspars represent 50.0 mole percent, the spinal 32.5 mole percent and the calcium aluminates 17.6 mole percent of the porous ceramic body of Example 2.

Figure 2:
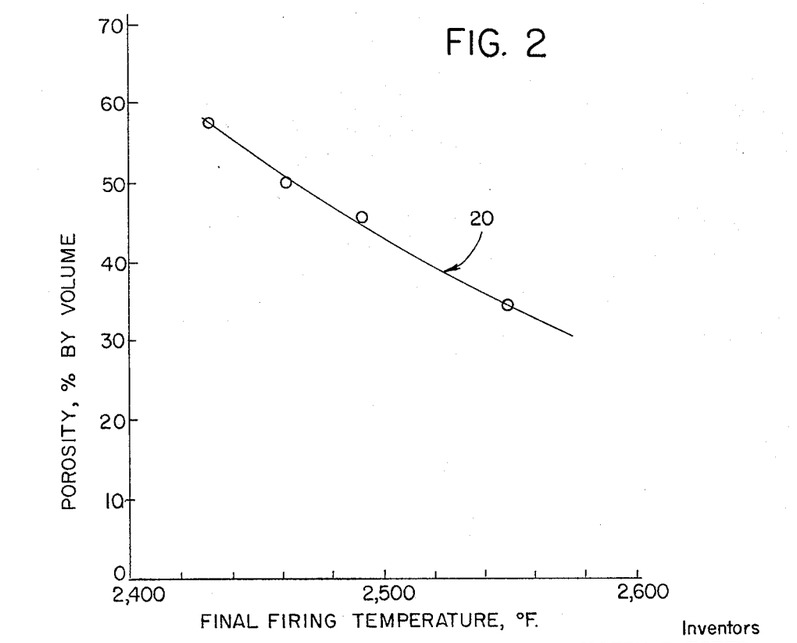
FIG. 2 is a graph showing the relationship between the controlled porosity of one embodiment of a porous ceramic body made in accordance with the present invention and the final firing temperature thereof.

As has been noted above, the porosity of the fully fired filter cone 10 can be controlled and varied within a substantial range from about 60% by volume down to about 6% or even less. There is set forth in FIG. 2 of the drawings a curve illustrating the relationship between the porosity of the filter cone 10 made in accordance with Example 2 above expressed in percent by volume thereof and the final firing temperature expressed in ° F. In general, the porosity decreases with an increase in the final firing temperature, there being a porosity of 50% in a porous ceramic body of Example 2 fired at 2,460° F. and a porosity of only 34% when fired at a temperature of 2,550° F. It is believed that the change in porosity results directly from recrystallizations that take place in the ceramic member and also by a shrinkage of the body and the passages therein, whereby the shrinkage of the body during final firing is also a function of the final firing temperature and is substantially proportional to the final firing temperatures, i.e., the lower the final firing temperature the less shrinkage that occurs and the higher the final firing temperature the more shrinkage that occurs. Thus by controlling the final firing temperature, the porosity and the shrinkage can both be controlled, and conversely, the final firing temperature must be known if the prefired porous ceramic body is to be machined accurately so as to give the desired final dimensions for the filter cone 10.

Figure 3:
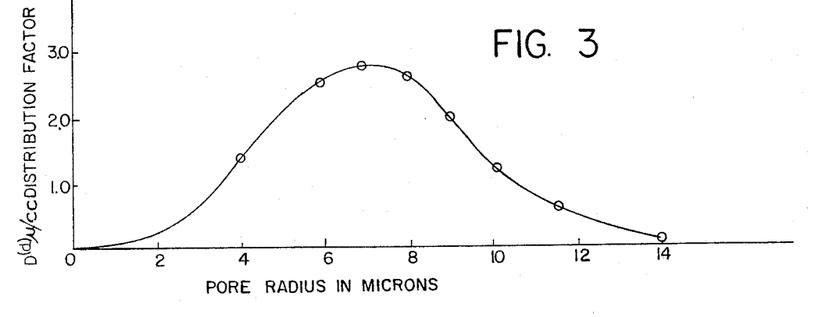
FIG. 3 is a graph showing the size of the pores in a porous ceramic body in the present invention and the distribution thereof in accordance with the pore size.

There is illustrated in FIG. 3 of the drawings the range of the sizes of pores present in the porous ceramic body made in accordance with Example 2, and the distribution of the various sizes of pores therein. It will be seen that the pores range in size from approximately one-half micron radius to approximately 14 microns radius with the greatest number of the pores having a radius of about 7 microns. By far the greater portion of all the pores have a radius in the range from about 3 microns to about 12 microns, whereby the size of the pores in the porous ceramic body are within a relatively narrow range of size. The data plotted in FIG. 5 were obtained utilizing the "mercury intrusion method" wherein a sample of the porous ceramic was placed in a test chamber of known volume which had previously been evacuated. Mercury was introduced into the test chamber and pressure applied on the test chamber in known increments. The changes in volume within the test chamber were recorded and the incremental changes in volume ($dV$) were plotted corresponding to the incremental changes in pressure ($dP$). From this curve it is possible to compute the values of the distribution factor, $D^{(d)}\mu/cc$.

Figure 4:
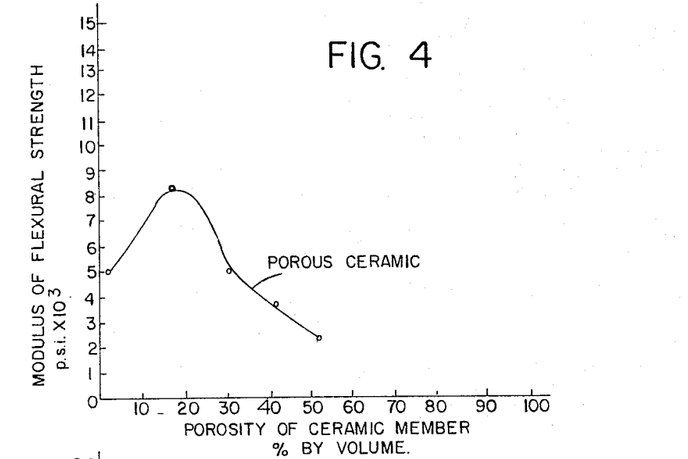
FIG. 4 is a graph showing the relationship between the modulus of flexural strength and the porosity of a porous ceramic body of the present invention.

Referring to FIG. 4 of the drawings there is shown a graph depicting the relationship between the modulus of flexural strength (modulus of rupture) and the porosity of porous ceramic bodies made in accordance with Example 2 above. The data in FIG. 4 were obtained by preparing bars of the porous ceramic measuring 4" x ½" x ¼"; a bar to be tested was supported at each end and a load applied from above at the center on a table model "Instron" machine. The crosshead was lowered at the rate of 0.2" per minute and an automatic recording made of the deflection produced in the test bar. The curve in FIG. 4 is a plot of the modulus of flexural strength expressed in pounds per square inch against the porosity expressed in percent by volume of the porous ceramic body, and from this curve it will be seen that the modulus of flexural strength gradually increases from 5,000 p.s.i. at a low porosity to a peak of about 8,500 p.s.i. at about 20% porosity and thereafter quickly decreases to about 2,500 p.s.i. as the porosity increases to 50%.

Figure 5:
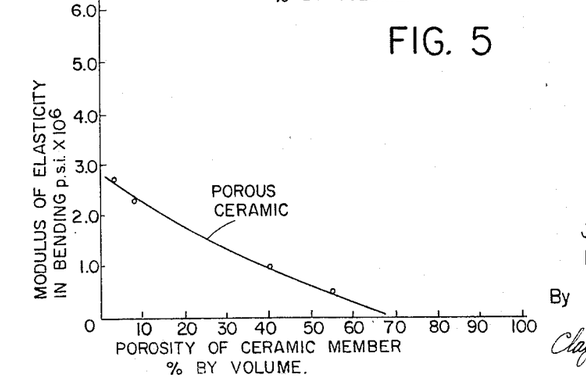
FIG. 5 is a graph showing the relationship between the modulus of elasticity in bending and the porosity of a porous ceramic body of the present invention.

There is plotted in FIG. 5 of the drawings the modulus of elasticity in bending for porous ceramic bodies made in accordance with Example 2 above versus the porosity thereof. The values for the modulus of elasticity in bending were derived from the same test utilized in producing the data for the modulus of flexural strength by means of the formula $$E_b = \frac{L^3 m}{4bd^3}$$

wherein $E_b$ is the modulus of elasticity in bending, L is the span between the points of support on the test bar, $m$ is the slope of the stress-strain curve for the test bar, $b$ is the width of the test bar and $d$ is the depth or thickness of the test bar in the direction of application of the load. From the curve in FIG. 5 it will be seen that the modulus of elasticity gradually decreases with an increase in porosity from a value of $2.75 \times 10^6$ at about 3% porosity to a value of about $0.05 \times 10^6$ at 55% porosity.

In general the aluminum oxide in the compositions of Examples 1 and 2 above imparts hardness and strength to the final product and also enhances the thermal shock resistance thereof, and more particularly, enters into the formation of the feldspars, the spinel, the calcium aluminates and the corundum present in the fully fired porous ceramic body. The silicon oxide is useful in maintaining the shape of the body during vitrification and if the amount in the composition is reduced substantially, it will be necessary to reduce the final firing temperature; and also the silicon oxide forms the very important tectosilicates in the final fired porous ceramic body and specifically enters into the formation of the feldspars and the quartz therein. The calcium carbonate and the magnesium carbonate provide the porosity and the calcium oxide and the magnesium oxide resulting therefrom from a part of the flux together with the calcium and the magnesium oxide present in the original ingredients; in addition the calcium oxide and the magnesium oxide enter into the formation of certain of the desired mineral species, namely, the spinel and the calcium aluminates present in the fully fired porous ceramic bodies. The sodium and potassium oxides and the iron oxide present in the original ingredients also serve as flux, although the content thereof is small, and also enter into the formation of the tectosilicates, and specifically the feldspars in the porous ceramic bodies made in accordance with Examples 1 and 2 above. Several kaolins are used in the specific examples to improve the casting properties of the slip and also to give a better control of the shrinkage during the prefiring of the green body. The talc in the compositions also improves the casting properties of the ceramic slip.

Referring again to Example 2 above and specifically to Table VIII thereof, it will be noted that the kaolins therein comprise 32% or substantially one-third of the total composition by weight, the alumina comprises 34% or about one-third of the total composition by weight and the dolomite comprises 32.5% or about one-third of the composition by weight. It has been found that the proportions among the various kaolins used may be varied without departing from the present invention and further that the total amount of alumina and the total amount of silica and the total amount of carbonates can likewise be varied. Referring more particularly to Table X of Example 2, it will be noted that the total aluminum oxide content thereof prior to firing is about 46% and it has been found that this can be varied from about 44% to about 57% in making the porous ceramic body in accordance with Example 2. The silicon oxide which comprises about 16% by weight of the total composition in the Example 2 can be varied therein from about 8% to about 25%. The calcium carbonate and magnesium carbonate which together comprise about 32.5% of the composition by weight can be varied from about 25% to about 39% and, furthermore, the proportion of calcium carbonate to magnesium carbonate can also be substantially varied without departing from the invention. In the fully fired ceramic material, the ingredients remaining therein are also variable over corresponding ranges, the ranges expressed as oxide equivalents of the ingredients being about 51% to about 66% aluminum oxide and from about 11% to about 26% silicon oxide and from about 18% to about 28% of an oxide of a metal selected from the group consisting of calcium and magnesium.

In general the materials must be ground to a size such that all pass 270 mesh and may further be ground to a size such that all pass 400 mesh. It also is desirable that the tubular alumina be preground to a size only slightly greater than the desired size thereof and, for example, when grinding the materials to a size to pass 325 mesh, the tubular alumina is preferably preground to a size of 300 mesh. The sodium silicate supplied during the grinding also aids in providing uniformity of size of the materials.

As has been mentioned heretofore, sufficient water is added before and during the grinding operation ordinarily to provide a water content in the slip of about 45% by weight, but it is understood that this can be substantially varied. For example, when it is desired to cast the slip by injection molding in a porous mold, the water content of the slip may be only 20%. Any of the normal methods of shaping the green body may be used including casting, pressing, molding and the like.

One particularly advantageous method of shaping a green body in accordance with the present invention is by an improved dry pressing procedure. In carrying out the improved dry pressing procedure, the ingredients are ground as set forth in Example 1 above so that all of the individual particles of the ingredients are of the required size. The mixture of ingredients is then dewatered and dried, after which about 0.2% by weight of a dry lubricant or sizing such as that sold under the trademark "Helowax" is added thereto. The ingredients with the lubricant or sizing therein is then formed into granules having a size on the order of 40 mesh to 10 mesh, a preferred size being 20 mesh, after which the granules are placed in a mold of the desired shape and a substantial pressure applied thereto on the order of 100 pounds per square inch to 4,000 pounds per square inch, a preferred pressure being 2,000 pounds per square inch, to shape the green body. After shaping the green body by the dry pressing technique, it is fired in the usual manner as set forth in Example 1 above.

Occasionally in the shaping of the prefired ceramic body it is desired to impart additional mechanical strength thereto, or to improve the smoothness of the surface formed during shaping, or to permit the use of more violent shaping and machining methods. In one preferred embodiment of the invention, a synthetic organic plastic resin such as a polyethylene resin is inserted into the pores of the prefired ceramic body substantially to fill the passages therein and thus to impart substantial additional strength thereto. This will permit a more violent treatment of a prefired body without inflicting undesired damage therein. Upon final firing of the prefired ceramic body with the polyethylene resin therein, the polyethylene present completely decomposes and the residue escapes from the pores and opens cells within the body thereby to produce a fully fired ceramic member having a better shaped or machined surface and having the same desired porosity as though the polyethylene had not been incorporated in the passages of the prefired ceramic body.

The firing of the green body must be carried out at a temperature at least above the decomposition temperature of the carbonates therein, and when one of the principal carbonates present is calcium carbonate, the firing of the green body must be carried out above 1,517° F. and preferably is carried out at about 1,600° F. or above. The prefiring temperature should be below the temperature at which the materials start to form a hard ceramic body, and in the case of Examples 1 and 2 above, the prefiring is preferably carried out at a temperature below about 2,000° F. The preferred prefiring temperature range is from about 1,800° F. to about 1,900° F.

The final firing of the ceramic body must be at a temperature such that the hardness thereof is increased whereby to insure good structural strength and other structural properties thereof and in general this necessitates firing above at least about 2,000° F., and in the case of Examples 1 and 2 above, preferably above at least about 2,300° F. In order to retain at least a minimum porosity after the final firing of the ceramic body, the firing temperature must not be too high since at the fusion temperature of the ceramic material, the open cells completely close and therefore it is preferred that the final firing temperature in the case of Examples 1 and 2 above be below at least 2,700° F. The preferred range of final firing is from about 2,400° F. to about 2,600° F.

In a filter, the new ceramic bodies made in accordance with Examples 1 and 2 above exhibit properties superior to various porous ceramics used heretofore in that they have a more uniform porosity extending entirely throughout the body thereof, have superior resistance to thermal shock, and are substantially completely inert even to hot corrosive chemicals including petroleum products and gases. The porous ceramic bodies are useful as a support for other filtering media or as a porous insert in certain special flame units.

It is believed that the porous ceramic bodies made in accordance with the present invention each comprise a framework of the tectosilicate which is physically porous to provide the desired porosity in the ceramic body, and which further has distributed therethrough isolated quantities of other mineral species such as corundum, spinel, periclase, calcium aluminates and the like. The framework provided by the tectosilicate can be envisioned as being three-dimensional in character and extending substantially throughout the porous ceramic body and combining therein the other mineral species present. It is believed further that the unusual properties of the porous ceramic bodies made in accordance with Example 1 above result from the fact that the tectosilicate therein, which is substantially anorthite, is a tough and hard material and the other mineral species distributed throughout the tectosilicate, namely, the corundum and spinel, are two of the hardest and most chemically resistant and mechanically strong mineral species available. The anorthite or other tectosilicate substantially surrounds and bonds the other mineral species presented such as the corundum and the spinel and forms a three-dimensional system that is physically porous but which cements the other mineral species into one single strong body. Furthermore, the bond between the tectosilicate and the other mineral species may be chemical as well as physical since there are unsatisfied broken bonds at the surfaces of the tectosilicate and at the surfaces of the other mineral species which can be utilized in interconnecting these various mineral species.

In the porous ceramic bodies made in accordance with Examples 1 and 2 above, it is preferred that the tectosilicate therein comprise at least about 30 mole percent to provide a sufficient framework for the porous ceramic body. The aluminates in the body including the calcium aluminates and the spinel may comprise up to about 30 mole percent of the porous ceramic body and the mineral oxides such as corundum and periclase may comprise up to about 50 mole percent of the porous ceramic body. It is possible by increasing substantially the calcium oxide in the starting ingredients to produce a small amount of free calcium oxide in the porous ceramic body, but it is necessary that the amount thereof be restricted to less than about 5 mole percent of the porous ceramic body to insure that the physical strength thereof is not unduly impaired.

In addition to the metal alkaline oxides utilized in Examples 1 and 2 above, it is possible to use in the present invention other alkaline metal oxides of other metals including lithium, beryllium, strontium and barium. Likewise, it is possible to use other sources of carbonate as desired, other suitable carbonates being lithium carbonate, sodium carbonate, strontium carbonate and barium carbonate. The following are additional examples of porous ceramic bodies made in accordance with the present invention. Example 3 through Example 8 essentially containing only one alkaline metal oxide therein.

EXAMPLE 3

The following proportions by weight of the ingredients indicated were mixed.

| Ingredient: | Percent by weight |
|---|---|
| Li$_2$CO$_3$ | 13.70 |
| Tabular alumina #61 | 20.50 |
| #600 kaolin | 23.35 |
| Tennessee ball clay | 20.30 |
| SiO$_2$, "Microsil" flint | 22.15 |
| | 100.00 |

The above ingredients were mixed using the method described above with respect to Example 1, a green body was cast therefrom, and the standard firing procedure was used to fire the resultant green body at a final firing temperature of 1,850° F. The fired body had the following composition:

| Oxide | Chemical Composition, Percent by Weight | Empirical Composition |
|---|---|---|
| Li$_2$O | 8.38 | 1.00 |
| Al$_2$O$_3$ | 41.20 | 1.93 |
| SiO$_2$ | 50.42 | 4.00 |
| | 100.00 | |

The resultant porous ceramic body had a porosity of 27.0% by volume thereof and a flexural strength of 3,975 p.s.i. The standard X-ray diffractometer examination of the porous ceramic body of Example 3 disclosed that it contained 65.0 mole percent lithium feldspar (Li$_2$O.Al$_2$O$_3$.6SiO$_2$)

12.5 mole percent quartz (SiO$_2$), 17.5 mole percent corundum (Al$_2$O$_3$), and 5.0 mole percent lithium aluminate (Li$_2$O.5Al$_2$O$_3$). It is believed that the lithium feldspar and the quartz form a three-dimensional network of tectosilicates that is physically porous and that contains distributed therethrough and both physically and chemically bonded thereto the other mineral species, namely, the corundum and the lithium aluminate.

EXAMPLE 4

The following proportions by weight of the ingredients indicated were mixed.

| Ingredient: | Percent by weight |
|---|---|
| Na$_2$CO$_3$ | 15.30 |
| Tabular alumina #61 | 16.00 |
| #600 kaolin | 18.20 |
| Tennessee ball clay | 15.90 |
| SiO$_2$, "Microsil" flint | 34.60 |
| | 100.00 |

The above ingredients were mixed using the method described above with respect to Example 1, a green body was cast therefrom and the standard firing procedure was used to fire the resultant green body at a final firing temperature of 1,500° F. The fired body had the following composition:

| Oxide | Chemical Composition, Percent by Weight | Empirical Composition |
|---|---|---|
| Na$_2$O | 10.10 | 1.00 |
| Al$_2$O$_3$ | 31.70 | 1.84 |
| SiO$_2$ | 58.20 | 6.00 |
| | 100.00 | |

The resultant porous ceramic body had a porosity of 23.5% by volume thereof and a flexural strength of 1,595 p.s.i. The standard X-ray diffractometer examination of the porous ceramic body of Example 4 discloses that it contained 44.5 mole percent of carnegieite $(Na_2O.Al_2O.Al_2O_3.2SiO_2$ a feldspathoid), 44.1 mole percent quartz and 11.4 mole percent corundum. It is believed that the carnegieite and the quartz form a three-dimensional network of tectosilicates that is physically porous and that contains distributed therethrough and both physically and chemically bonded thereto the other mineral species, namely, the corundum.

EXAMPLE 5

The following proportions by weight of the ingredients indicated were mixed.

| Ingredient: | Percent by weight |
|---|---|
| Calcium carbonate | 43.2 |
| Tabular alumina #61 | 14.2 |
| #600 kaolin | 18.2 |
| Tennessee ball clay | 15.8 |
| $SiO_2$, "Microsil" flint | 8.6 |
| | 100.0 |

The above ingredients were mixed using the method described above with respect to Example 1, a green body was cast therefrom and the standard firing procedure was used to fire the resultant green body at a final firing temperature of 2,000° F. The fired body had the following composition:

| Oxide | Chemical Composition, Percent by Weight | Empirical Composition |
|---|---|---|
| CaO | 32.0 | 1.000 |
| $Al_2O_3$ | 34.5 | 0.666 |
| $SiO_2$ | 33.5 | 1.000 |
| | 100.0 | |

The resultant porous ceramic body had a porosity of 43.3% by volume thereof and a flexural strength of 1,375 p.s.i. The standard X-ray diffractometer examination of the porous ceramic body of Example 5 disclosed that it contained 5.0 mole percent calcium feldspar (anorthite, $CaO.Al_2O_3.2SiO_2$), 72.8 mole percent calcium gehlenite ($2CaO.Al_2O_3.SiO_2$, a feldspathoid), 18.6 mole percent quartz and 3.6% corundum. It is believed that the calcium feldspar and the calcium gehlenite and the quartz from a three-dimensional network of tectosilicates that is physically porous and that contains distributed therethrough and both physically and chemically bonded thereto the other mineral species, namely, the corundum.

EXAMPLE 6

The following proportions by weight of the ingredients indicated were mixed.

| Ingredient: | Percent by weight |
|---|---|
| $CaCO_3$ | 24.3 |
| Tabular alumina #61 | 28.1 |
| #600 kaolin | 15.4 |
| Tennessee ball clay | 26.8 |
| $SiO_2$, "Microsil" flint | 5.4 |
| | 100.0 |

The above ingredients were mixed using the method described above with respect to Example 1, a green body was cast therefrom, and the standard firing procedure was used to fire the resultant green body at a final firing temperature of 2,000° F. The fired body had the following composition:

| Oxide | Chemical Composition, Percent by Weight | Empirical Composition |
|---|---|---|
| CaO | 16.5 | 1.00 |
| $Al_2O_3$ | 51.5 | 1.73 |
| $SiO_2$ | 32.0 | 1.87 |
| | 100.0 | |

The resultant porous ceramic body had a porosity of 31.4% by volume thereof and a flexural strength of 3,885 p.s.i. The standard X-ray diffractometer examination of the porous ceramic body of Example 6 disclosed that it contained a trace of calcium feldspar (anorthite), 44.2 mole percent calcium gehlenite, 28.9 mole percent quartz and 26.9 mole percent corundum. It is believed that the calcium feldspar and the calcium gehlenite and the quartz form a three-dimensional network of tectosilicates that is physically porous and that contains distributed therethrough and both phyically and chemically bonded thereto the other mineral species, namely, the corundum.

EXAMPLE 7

The following proportions by weight of the ingredients indicated were mixed.

| Ingredient: | Percent by weight |
|---|---|
| $SrCO_3$ | 25.3 |
| Tabular alumina #61 | 42.6 |
| #600 kaolin | 10.9 |
| Tennessee ball clay | 18.9 |
| $SiO_2$, "Microsil" flint | 2.3 |
| | 100.0 |

The above ingredients were mixed using the method described above with respect to Example 1, a green body was cast therefrom, and the standard firing procedure was used to fire the resultant green body at a final temperature of 2,110° F. The fired body had the following composition:

| Oxide | Chemical Composition, Percent by Weight | Empirical Composition |
|---|---|---|
| $SrO_2$ | 19.60 | 1.000 |
| $Al_2O_3$ | 60.15 | 3.050 |
| $SiO_2$ | 20.25 | 1.725 |
| | 100.00 | |

The resultant porous ceramic body had a porosity of 34.0% by volume thereof and a flexural strength of 3,865 p.s.i. The standard X-ray diffractometer examination of the porous ceramic body of Example 7 disclosed that it contained 20.3 mole percent strontium feldspar ($SrO.Al_2O_3.2SiO_2$), 23.7 mole percent strontium gehlenite ($2SrO.Al_2O_3.SiO_2$, a feldspathoid), 14.2 mole percent quartz and 41.8 mole percent corundum. It is believed that the strontium feldspar and the strontium gehlenite and the quartz form a three-dimensional network of tectosilicates that is physically porous and that contains distributed therethrough and both physically and chemically bonded thereto the other mineral species, namely, the corundum.

EXAMPLE 8

The following proportions by weight of the ingredients indicated were mixed.

| Ingredient: | Percent by weight |
|---|---|
| $BaCO_3$ | 36.2 |
| Tabular alumina #61 | 30.9 |
| #600 kaolin | 11.6 |
| Tennessee ball clay | 20.2 |
| $SiO_2$, "Microsil" flint | 1.1 |
| | 100.0 |

The above ingredients were mixed using the method described above with respect to Example 1, a green body was cast therefrom, and the standard firing procedure was used to fire the resultant green body at a final firing temperature of 2,110° F. The fired body had the following composition:

| Oxide | Chemical Composition, Percent by Weight | Empirical Composition |
|---|---|---|
| BaO | 32.35 | 1.00 |
| $Al_2O_3$ | 48.10 | 2.26 |
| $SiO_2$ | 19.55 | 1.60 |
|  | 100.00 |  |

The resultant porous ceramic body had a porosity of 29.5% by volume thereof and a flexural strength of 3,280 p.s.i. The standard X-ray diffractometer examination of the porous ceramic body of Example 8 disclosed that it contained 64.6 mole percent barium feldspar ($BaO.Al_2O_3.2SiO_2$, celsian), 9.6% barium aluminate ($BaO.Al_2O_3$) and 25.9 mole percent corundum. It is believed that the barium feldspar forms a three-dimensional network of tectosilicates that is physically porous and that contains distributed therethrough and both physically and chemically bonded thereto the other mineral species, namely, the corundum and the barium aluminate.

The following are examples of porous ceramic bodies made in accordance with the present invention and containing two alkaline metal oxides therein.

EXAMPLE 9

The following proportions by weight of the ingredients indicated were mixed.

| Ingredient: | Percent by weight |
|---|---|
| Feldspar F-4 | 35.65 |
| $CaCO_3$ | 25.70 |
| Tennessee ball clay | 7.65 |
| Tabular alumina #61 | 31.00 |
|  | 100.00 |

The above ingredients were mixed using the method described above with respect to Example 1, a green body was cast therefrom, and the standard firing procedure was used to fire the resultant green body at a final firing temperature of 2,000° F. The fired body had the following composition:

| Oxide | Chemical Composition, Percent by Weight | Empirical Composition |
|---|---|---|
| $K_2O$ | 5.93 | 0.177 |
| CaO | 16.36 | 0.823 |
| $Al_2O_3$ | 45.26 | 1.250 |
| $SiO_2$ | 32.45 | 1.530 |
|  | 100.00 |  |

The resultant porous ceramic body had a porosity of 36.5% by volume thereof. The standard X-ray diffractometer examination of the porous ceramic body of Example 9 disclosed that it contained 37.8 mole percent potassium feldspar ($K_2O.Al_2O_3.6SiO_2$, orthoclase), 43.6 mole percent calcium gehlenite ($2CaO.Al_2O_3.SiO_2$), 17.6 mole percent corundum and 1.2 mole percent quartz. It is believed that the potassium feldspar and the calcium gehlenite and the quartz form a three-dimensional network of tectosilicates that is physically porous and that contains distributed therethrough and both physically and chemically bonded thereto the other mineral species, namely, the corundum.

EXAMPLE 10

The following proportions by weight of the ingredients indicated were mixed.

| Ingredient: | Percent by weight |
|---|---|
| $BaCO_3$ | 31.0 |
| $MgCO_3$ | 10.1 |
| Tennessee ball clay | 30.4 |
| #600 kaolin | 9.6 |
| Tabular alumina #61 | 18.9 |
|  | 100.0 |

The above ingredients were mixed using the method described above with respect to Example 1, a green body was cast therefrom, and the standard firing procedure was used to fire the resultant green body at a final firing temperature of 2,000° F. The fired body had the following composition:

| Oxide | Chemical Composition, Percent by Weight | Empirical Composition |
|---|---|---|
| MgO | 6.0 | 0.433 |
| BaO | 30.0 | 0.567 |
| $Al_2O_3$ | 48.0 | 1.173 |
| $SiO_2$ | 16.0 | 0.773 |
|  | 100.0 |  |

The resultant porous ceramic body had a porosity of 48.3% by volume thereof and a flexural strength of 965 p.s.i. The standard X-ray diffractometer examination of the porous ceramic body of Example 10 disclosed that it contained 49.4 mole percent barium feldspar ($BaO.Al_2O_3.2SiO_2$ celsian), 11.4 mole percent barium aluminate, 25.4 mole percent corundum and 13.8 mole percent periclase. It is believed that the barium feldspar forms a three-dimensional of tectosilicates that is physically porous and that contains distributed therethrough and both physically and chemically bonded thereto the other mineral species, namely, the barium aluminate, the corundum and the periclase.

EXAMPLE 11

The following proportions by weight of the ingredients indicated were mixed.

| Ingredient: | Percent by weight |
|---|---|
| $CaCO_3$ | 22.3 |
| $SrCO_3$ | 11.9 |
| #600 kaolin | 10.5 |
| Tennessee ball clay | 14.0 |
| Tabular alumina #61 | 41.3 |
|  | 100.0 |

The above ingredients were mixed using the method described above with respect to Example 1, a green body was cast therefrom, and the standard firing procedure was used to fire the resultant green body at a final firing temperature of 2,000° F. The fired body had the following composition:

| Oxide | Chemical Composition, Percent by Weight | Empirical Composition |
|---|---|---|
| CaO | 15.0 | 0.735 |
| SrO | 10.0 | 0.265 |
| $Al_2O_3$ | 60.0 | 1.620 |
| $SiO_2$ | 15.0 | 0.685 |
|  | 100.0 |  |

The resultant porous ceramic body had a porosity of 34.9% by volume thereof and a flexural strength of 3,110 p.s.i. The standard X-ray diffractometer examination of the porous ceramic body of Example 11 disclosed that it contained 60.6 mole percent of a mixture or combination of calcium gehlenite and strontium gehlenite, 33.8 mole percent corundum and 5.6 mole percent quartz. It is believed that the calcium gehlenite and the strontium gehlenite and the quartz form a three-dimensional network of tectosilicates that is physically porous and that contains distributed therethrough and both physically and chemically bonded thereto the other mineral species, namely, the corundum.

EXAMPLE 12

The following proportions by weight of the ingredients indicated were mixed.

Ingredient: Percent by weight
CaCO$_3$ ----------------------------------- 19.0
BaCO$_3$ ----------------------------------- 13.8
Tennessee ball clay ------------------------ 14.3
600 kaolin -------------------------------- 10.6
Tabular alumina #61 ----------------------- 42.3

The above ingredients were mixed using the method described above with respect to Example 1, a green body was cast therefrom, and the standard firing procedure was used to fire the resultant green body at a final firing temperature of 2,000° F. The fired body had the following composition:

| Oxide | Chemical Composition, Percent by Weight | Empirical Composition |
|---|---|---|
| CaO | 12.5 | 0.732 |
| BaO | 12.5 | 0.268 |
| Al$_2$O$_3$ | 60.0 | 1.935 |
| SiO$_2$ | 15.0 | 0.820 |
| | 100.0 | |

The resultant porous ceramic body had a porosity of 37.1% by volume thereof and flexural strength of 2,115 p.s.i. The standard X-ray diffractometer examination of the porous ceramic body of Example 12 disclosed that it contained 28.5 mole percent barium feldspar (celsian), 30.3 mole percent calcium gehlenite, 8.7 mole percent calcium aluminate and 32.5 mole percent corundum. It is believed that the barium feldspar and the calcium gehlenite form a three-dimensional network of tectosilicates that is physicaally porous and that contains distributed therethrough and both physically and chemically bonded thereto the other mineral species, namely, the calcium aluminate and the corundum.

Examples 1 and 2 above both illustrate the utilization of four alkaline metal oxides in the porous ceramic body. The following Example 13 also illustrates the use of four alkaline metal oxides in the porous ceramic body and Example 14 illustrates the use of five alkaline metal oxides in a porous ceramic body, all in accordance with the present invention.

EXAMPLE 13

The following proportions by weight of the ingredients indicated were mixed.

Ingedient: Percent by weight
BaCO$_3$ ----------------------------------- 7.72
Dolomite "A—A" --------------------------- 6.62
MgCO$_3$ ----------------------------------- 6.77
BeO --------------------------------------- 2.22
Tennessee ball clay ------------------------ 31.00
Flint -------------------------------------- 0.67
Tabular alumina #61 ----------------------- 45.00
                                             100.00

The above ingredients were mixed using the method described above with respect to Example 1, a green body was cast therefrom, and the standard firing procedure was used to fire the resultant green body at a final firing temperature of 2,110° F. The fired body had the following composition:

| Oxide | Chemical Composition, Percent by Weight | Empirical Composition |
|---|---|---|
| MgO | 8.50 | 0.415 |
| BeO | 4.00 | 0.315 |
| CaO | 3.96 | 0.131 |
| BaO | 10.22 | 0.139 |
| Al$_2$O$_3$ | 56.60 | 1.940 |
| SiO$_2$ | 16.72 | 0.548 |
| | 100.00 | |

The resultant porous ceramic body had a porosity of 39.0% by volume thereof and a flexural strength of 1,500 p.s.i. The standard X-ray diffractometer examination of the porous ceramic body of Example 13 disclosed that it contained 19.9 mole percent barium feldspar (celsian), 10.5 mole percent calcium gehlenite, 8.2 mole percent quartz, 23.8 mole percent beryllium aluminate (BeO.Al$_2$O$_3$, crysoberyl), 15.8 mole percent periclase and 21.9 mole percent corundum. It is believed that the barium feldspar and the calcium gehlenite and the quartz form a three-dimensional network of tectosilicates that is physically porous and that contains distributed therethrough and both physically and chemically bonded thereto the other mineral species, namely, the beryllium aluminate, the periclase and the corundum.

EXAMPLE 14

The following proportion by weight of the ingredients indicated were mixed.

Ingredient: Percent by weight
BeO --------------------------------------- 2.13
BaCO$_3$ ----------------------------------- 7.37
SrCO$_3$ ----------------------------------- 4.76
Dolomite "A—A" --------------------------- 6.72
MgCO$_3$ ----------------------------------- 9.33
Tennessee ball clay ------------------------ 37.45
600 kaolin -------------------------------- 9.19
Tabular alumina #61 ----------------------- 21.75
Flint -------------------------------------- 1.30
                                             100.00

The above ingredients were mixed using the method described above with respect to Example 1, a green body was cast therefrom, and the standard firing procedure was used to fire the resultant green body at a final firing temperature of 2,110° F. The fired body had the following composition:

| Oxide | Chemical Composition, Percent by Weight | Empirical Composition |
|---|---|---|
| MgO | 8.50 | 0.435 |
| BeO | 3.00 | 0.250 |
| CaO | 2.96 | 0.110 |
| BaO | 8.15 | 0.110 |
| SrO | 4.80 | 0.095 |
| Al$_2$O$_3$ | 54.10 | 1.100 |
| SiO$_2$ | 18.49 | 0.785 |
| | 100.00 | |

The resultant porous ceramic body had a porosity of 40.0% by volume thereof and flexural strength of 1,520 p.s.i. The standard X-ray diffractometer examination of the porous ceramic body of Example 14 disclosed that it contained 16.1 mole percent barium feldspar (celsian), 8.0 mole percent calcium gehlenite, 7.0 mole percent strontium gehlenite, 23.3 mole percent quartz, 18.1 mole percent barium aluminate (chrysoberyl), 15.9 mole percent periclase and 11.5 mole percent corundum. It is believed that the barium feldspar and the calcium gehlenite and the strontium gehlenite and the quartz form a three-dimensional network of tectosilicates that is physically porous and that contains distributed therethrough and both physically and chemically bonded thereto the other mineral species, namely, the barium aluminate, the periclase and the corundum.

A composite member having unusual and desirable properties can be provided by placing in the passages of any one of the porous ceramic bodies of Examples 1 to 14, above, some other material which can impart a desired characteristic thereto. When the composite body is to be used for purposes of insulation, a liquid material can be utilized to fill the passages within the ceramic porous body. Alternatively, if the composite member is to be used as a bearing element, lubricants may be utilized to fill the passages therein; more particularly viscous or semi-solid materials and lubricants such as a grease or a heavy metal soap lubricant may be placed in the passages of the porous ceramic body of the present invention to provide a composite member useful as a bearing element. For example, a porous ceramic body made in accordance with Example 2 above was placed in a container having therein carbon dispersed in a volatile carrier. The carrier with the carbon therein was drawn by capillary action into the porous ceramic body, and as the volatile carrier evaporated, the carbon was deposited in the passages of the porous ceramic body. Another porous ceramic body made in accordance with Example 2 above was placed in a container having therein a solution of a heavy metal soap dispersed in a volatile carrier, the solution being drawn into the capillary passages of the porous ceramic body; upon evaporation of the volatile carrier, the heavy metal soap was deposited throughout the passages of the porous ceramic body to provide a composite member useful as a bearing element.

Various solid materials may also be placed in the passages of the porous ceramic bodies of the present invention to provide desirable composite members, a preferred class of solid materials being the synthetic organic plastic resins. In general any resin may be used providing that at one stage in the formulation thereof, the various constituents of the resin or the various compounds which react to form the resin are liquid and have a sufficiently low viscosity so as to be drawn into the capillary pores of the porous ceramic body either at atmospheric pressure or under vacuum or under elevated pressure. In certain instances it is desirable that the constituents forming the hardened resin react to produce no volatile by-products so that the solid resin formed within the pores of the ceramic body forms a continuous phase in the ceramic body which is in turn dispersed within another continuous phase provided by the porous ceramic body. Suitable examples of useful synthetic organic resins are those which are generally used in the "potting" of various elements such as electrical circuit elements including, for example, the epoxy resins, the polyester resins and the silicone resins. Other resins may also be used such as the fluorocarbon resins sold under the trademark "Teflon" and the polyurethane resins. Mixtures of the above resins may also be used to advantage in certain instances to impart desired characteristics to the hardened resins within the composite member.

In general, any of the methods of impregnating resins in structures utilized heretofore are satisfactory for the purpose of impregnating the porous ceramic bodies of the present invention, and particularly useful are the vacuum systems and the pressure systems which force the resin into the capillary passages within the porous ceramic body. Certain of the resins such as the epoxy resins and the polyurethane resins which are tightly adherent to the walls of the passages of the porous ceramic body impart unusually additional strength and particularly additional impact strength and flexural strength to the resultant composite member when invested in the porous ceramic bodies of the present invention.

As a specific example of impregnating a ceramic piece of the present invention with a suitable organic plastic resin, a ceramic body made in accordance with Example 1 above was placed in a vessel containing a low viscosity mixture including the liquid epoxy composition sold under the trademark "ERL–2774" mixed with a hardening agent of the hydroxyaliphatic amine type sold under the trademark "ZZLB–0814," the components being present in near-stoichiometric concentrations and having a viscosity of only about 400 centipoises at 25° C. The resin mixture was quickly absorbed into the ceramic body and after 30 minutes the resin mixture had hardened to form a second continuous phase completely filling the pores of the first continuous phase provided by the ceramic body.

The following table summarizes the results of impregnating other porous ceramic bodies made in accordance with the present invention utilizing the impregnation method set forth above:

| Example | Porosity, Percent by Volume | Flexural Strength, p.s.i. | |
|---|---|---|---|
| | | Ceramic Alone | Ceramic Impregnated |
| 3 | 27.0 | 3,975 | 11,205 |
| 4 | 23.5 | 1,595 | 7,785 |
| 5 | 43.3 | 1,375 | 10,915 |
| 6 | 31.4 | 3,885 | 11,375 |
| 7 | 34.0 | 3,865 | 12,040 |
| 8 | 29.5 | 3,280 | 10,520 |
| 10 | 48.3 | 965 | 5,645 |
| 11 | 34.9 | 3,110 | 11,720 |
| 12 | 37.1 | 2,115 | 10,880 |
| 13 | 39.0 | 1,500 | 10,280 |
| 14 | 40.0 | 1,520 | 8,010 |

It will be seen from the above that impregnating the porous ceramic body materially increases the flexural strength thereof, it being pointed out also that the cured epoxy resin itself has a flexural strength of 14,000 p.s.i. and a modulus of elasticity of $0.43 \times 10^6$ p.s.i.

Even metals or metal alloys can be inserted into the passages of the ceramic body made in accordance with the present invention provided that the metal or metal alloy has a melting point below the softening point of the ceramic body. A preferred class of metals to be placed in the passages of the ceramic bodies are the lightweight metals such as aluminum, certain high silicon aluminum alloys having unusually low viscosities when melted at temperatures well below the softening point of the ceramic body whereby to permit deposition thereof within the ceramic body with ease. Upon cooling, the metal alloy completely fills the passages in the ceramic body to provide a second continuous phase completely filling the passages in the first continuous phase provided by the ceramic material. Other metals that melt at low temperatures such as lead, zinc and alloys thereof may likewise be used to fill the passages in the porous ceramic body.

The capillary character of the passages throughout the ceramic body renders possible the placement of a wide variety of filler materials in the passages thereof an in addition to the specific formulations set forth above, it is noted that the synthetic organic plastic resins can have fillers including glass fibers and the like therein. In all cases the porous ceramic body and the composite member provides a first continuous phase and the filler material in the passages within the porous ceramic body forms a second continuous phase in the composite member that is intimately interlocked with and extends completely throughout the composite member.

Yet another particularly useful article is made by depositing on the surfaces of the passages of a porous ceramic body of the present invention a coating of a metal or a coating of a synthetic organic plastic resin. For example, a coating of nickel can readily be deposited by electroless chemical nickel plating upon the surfaces of the passages therein thereby to provide a large surface area relative to the volume thereof for effecting the catalysis of various chemical reactions. Other coatings including those formed of palladium, platinum or combinations of nickel, palladium and platinum either alone or within synthetic organic plastic resins may be applied in a like manner.

It is to be understood that other sources of silica and other sources of aluminum may be used in place of those used in Examples 1 to 14 above. More specifically, other types of kaolins and other types of flints may be utilized. Likewise, other sources of carbonates may be utilized, all as is well known in the art. In general it is desired that the carbonates be present in an amount equal to at least about 5 mole percent up to about 40 mole percent of the starting composition.

It will be seen that there have been provided improved porous ceramic bodies and improved composite members, and improved methods of making them which fulfill all of the objects and advantages set forth above. Although certain preferred examples of the invention have been given for purposes of illustration, it is to be understood that various changes and modifications can be made therein without departing from the spirit and scope thereof, and it is intended to cover in the appended claims all such changes and modifications that fall within the scope of the present invention.

What is claimed is:

1. The method of making a porous ceramic member comprising forming a mixture consisting essentially by weight of from about 44% to about 57% alumina and from about 8% to about 25% silica and from about 25% to about 39% of a carbonate of a metal selected from the group consisting of calcium and magnesium, shaping the mixture to form a body having a desired shape, heating said body to an elevated temperature in the range from about 2,300° F. to about 2,700° F. to fire said body, and cooling said body to provide a porous ceramic member having a plurality of open cells of capillary size distributed therethrough and interconnected to form passages extending from each area in said member to any other area in said member and to and terminating at the surface of said member.

2. The method of making a shaped porous ceramic member comprising, forming a mixture consisting essentially of substantially equal parts by weight of kaolin and alumina and dolomite, grinding said mixture to a particle size in the range from about 400 mesh to about 270 mesh, shaping the mixture to form an unfired body having a first predetermined shape, heating said unfired body to an elevated temperature in the range from about 1,600° F. to about 2,000° F. to provide a prefired body, shaping said prefired body with ordinary tools to impart a second predetermined shape thereto, heating said prefired body to an elevated temperature in the range from about 2,300° F. to about 2,700° F. to provide a fully fired body, and cooling said fully fired body to provide a shaped porous ceramic member having a plurality of open cells of capillary size distributed therethrough and interconnected to form passages extending from each area in said member to any other area in said member and to and terminating at the surface of said member.

3. The method of making a shaped porous ceramic member comprising, forming a mixture consisting essentially by weight from about 44% to about 57% alumina and from about 8% to about 25% silica and from about 25% to about 39% of a carbonate of a metal selected from the group consisting of calcium and magnesium, grinding said mixture to a particle size in the range from about 400 mesh to about 270 mesh, shaping the mixture to form an unfired body having a first predetermined shape, heating said unfired body to an elevated temperature in the range from about 1,600° F. to about 2,000° F. to provide a prefired body, shaping said prefired body with ordinary tools to impart a second predetermined shape thereto, heating said prefired body to an elevated temperature in the range from about 2,300° F. to about 2,700° F. to provide a fully fired body, and cooling said fully fired body to provide a shaped porous ceramic member having a plurality of open cells of capillary size distributed therethrough and interconnected to form passages extending from each area in said member to any other area in said member and to and terminating at the surface of said member.

4. An admixture for forming a porous ceramic body consisting essentially of a mixture by weight of from about 44% to about 57% alumina, from about 8% to about 25% silica, and from about 25% to about 39% of a carbonate of a metal selected from the group consisting of calcium and magnesium.

5. An admixture for forming a porous ceramic body consisting essentially of a mixture by weight of from about 44% to about 57% alumina, from about 8% to about 25% silica, from about 14% to about 22% calcium carbonate, and from about 11% to about 17% magnesium carbonate.

References Cited by the Examiner

UNITED STATES PATENTS

| | | | |
|---|---|---|---|
| 1,967,275 | 7/1934 | Williams | 106—40 |
| 2,007,053 | 7/1935 | Howe | 264—43 |
| 2,631,940 | 3/1953 | Dunegan | 106—46 |
| 3,075,846 | 1/1963 | Seltmann | 106—40 |
| 3,093,593 | 6/1963 | Arrance | 106—40 |
| 3,116,522 | 1/1964 | Taylor et al. | 106—41 |

FOREIGN PATENTS 601,989   5/1945   Great Britain.

OTHER REFERENCES

Glossary of Geology and Related Sciences, 2nd Edition, November 1960, pub. by Amer. Geol. Institute and N.A.S., Washington, D.C.

Luks: "Porous Ceramics," Ceramic Age, September 1957, pages 32–35.

TOBIAS E. LEVOW, *Primary Examiner.*

H. McCARTHY, *Assistant Examiner.*